United States Patent Office 3,367,966
Patented Feb. 6, 1968

---

3,367,966
PRODUCTION OF 1,3-GLYCOL HALF ESTERS
Robert J. Knopf, St. Albans, and Louis F. Theiling, Jr., Charleston, W. Va., assignors to Union Carbide Corporation, a corporation of New York
No Drawing. Filed Jan. 22, 1965, Ser. No. 427,514
4 Claims. (Cl. 260—494)

The invention relates to a process for the production of half esters of 1,3-glycols. In a particular aspect, the invention relates to a process for the production of half esters of 1,3-glycols by the thermal rearrangement of 4-m-dioxanols.

Half esters of 1,3-glycols are useful in many applications. For example, they are useful as plasticizers for vinyl chloride polymers, as lubricants, as reaction intermediates which is exemplified by their reaction with ethylene oxide to form surfactants, and the like. The present invention provides an economic process for the production of these useful materials.

The process of the invention comprises thermally decomposing a 4-m-dioxanol in a closed reaction zone for a period of time sufficient to produce a half ester of a 1,3-glycol. The 4-m-dioxanols that are employed in the process of the invention can be represented by Formula I:

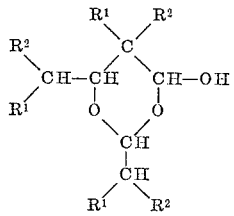

wherein each $R^1$ and $R^2$ individually can be hydrogen, alkyl, alkenyl, alkynyl, cycloalkyl, cycloalkenyl, aryl, aralkyl, alkaryl, $R^1$ and $R^2$ taken together with the carbon atom to which they are bonded to form cycloalkyl, cycloalkenyl, and the like, and many other organic groups having up to, for example, 10 carbon atoms. Specific illustrative 4-m-dioxanols include 2,6-dimethyl-4-hydroxy-1,3-dioxane, 2,6-diethyl-5-methyl-4-hydroxy-1,3-dioxane, 2,6-diisopropyl-5,5-dimethyl-4-hydroxy-1,3-dioxane, 2,6-di(2-butyl)-5-methyl-5-ethyl-4-hydroxy-1,3-dioxane, 2,6-di(3-pentyl)-5,5-diethyl-4-hydroxy-1,3-dioxane, 2,6-dipropyl-5-ethyl-4-hydroxy-1,3-dioxane, 2,6-di(3-heptyl)-5-ethyl-5-butyl-4-hydroxy-1,3-dioxane, 2,6-diallyl-5-vinyl-4-hydroxy-1,3-dioxane, 2,6-dicyclohexyl-4-hydroxy-1,3-dioxaspiro-[5.5]undecane, 2,6-dibenzyl-5-phenyl-4-hydroxy-1,3-dioxane, and the like. The preferred 4-m-dioxanols are those wherein $R^1$ and $R^2$ in Formula I represent alkyl. The most preferred 4-m-dioxanol is 2,6-diisopropyl-5,5-dimethyl-4-hydroxy-1,3-dioxane.

The 4-m-dioxanols that are employed as starting materials in the process of the invention can be produced by known methods. For example, the 4-m-dioxanols that are represented by Formula I can be produced by contacting an aldehyde of the formula

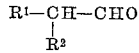

(wherein $R^1$ and $R^2$ have the significance stated above with respect to Formula I) with an alkaline catalyst at temperatures in the range of from about 0° C. to about 20° C.

The process of the invention is carried out by heating a 4-m-dioxanol in a closed reaction zone to produce a half ester of a 1,3-glycol. The half esters formed by the process of the invention are a mixture of compounds that are represented by Formulas II and III:

II 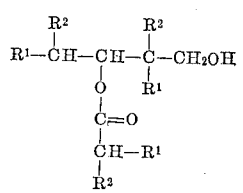

III 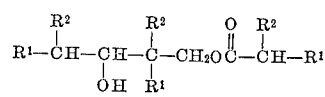

wherein the variables $R^1$ and $R^2$ have the significance stated above with respect to the $R^1$ and $R^2$ variables of Formula I. The proportion of the two esters in the product can vary widely. For instance, the product can be composed of from about 95 weight percent to about 5 weight percent of the half-ester that is represented by Formula II, with the remainder being the half-ester that is represented by Formula III. More usually, the product is composed of from about 30 to about 70 weight percent of the half-ester of Formula II, the remainder being the half-ester of Formula III.

The temperature at which the process of the invention is carried out is an elevated temperature sufficient to decompose the 4-m-dioxanol starting material. The exact temperature employed will depend, in part, upon the nature of the 4-m-dioxanol employed. For example, if the 4-m-dioxanol employed is 2,6-dimethyl-4-hydroxy-1,3-dioxane, the decomposition temperature is rather low, for instance, from about 75° to about 100° C. If the 4-m-dioxanol is a 2,6-di(n-alkyl)-5-(n-alkyl)-4-hydroxy-1,3-dioxane such as 2,6-diethyl-5-methyl-4-hydroxy-1,3-dioxane, the decomposition temperature is a little higher, for instance, from about 100° to about 120° C. If the 4-m-dioxanol is a 2,6-diisoalkyl-5,5-dialkyl-4-hydroxy-1,3-dioxane such as 2,6-diisopropyl-5,5-dimethyl-4-hydroxy-1,3-dioxane, the decomposition temperature is still higher, for instance, from about 120° to about 130° C. Thus, the process of the invention is carried out at a temperature of at least the decomposition temperature of the 4-m-dioxanol, and will usually be within the range of from about 75° C. to about 250° C., or higher, preferably, from about 90° C. to about 200° C., and more preferably from about 110° C. to about 140° C.

An important feature of the invention is that the process is carried out in a closed reaction zone such that the products of the reaction are maintained in the reaction mixture. Therefore, the process is preferably carried out in a closed reaction vessel such as an autoclave, or in a reaction vessel equipped with refluxing means and means such as pressure to maintain reaction temperature, or the like. When the reaction is carried out under reflux, the volatility of the various components of the reaction mixture will dictate the pressure that is needed to maintain the desired reaction temperature. The reaction is carried out for a period of time sufficient to produce a mixture of 1,3-glycol half esters that are represented by Formulas II and III. The exact reaction time depends, in part, upon factors such as temperature, nature of reactants, and the like, but will usually be within the range of from about 1 hour to about 20 hours and preferably from 4 to 10 hours. The reaction pressure can be from sub-atmospheric to super-atmospheric, and is not narrowly critical. Usually, the pressure will be autogenous.

An inert reaction medium can be used if desired, but such use is not necessary.

In a preferred embodiment of the invention, an aldehyde is included in the reaction mixture in addition to the 4-m-dioxanol. An aldehyde that does not contain alpha, beta-olefinic or acetylenic unsaturation (such as acrolein, crotonaldehyde, and the like) can be used for this purpose. It will be desirable in many cases to employ an aldehyde that is represented by Formula IV:

IV 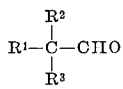

wherein $R^1$, $R^2$, and $R^3$ have the significance stated above with respect to the $R^1$ and $R^2$ variables of Formula I. The aldehydes that can be employed include acetaldehyde, propionaldehyde, n-butyraldehyde, isobutyraldehyde, n-valeraldehyde, n-caproaldehyde, n-heptaldehyde, dodecaldehyde, 3-cyclohexylbutyraldehyde, 2-etheylhexanol, 2-methyl-4-phenylbutyraldehyde, and the like. In addition, aldehydes that do not contain an enolizable hydrogen such as 2,2-dimethylpropionaldehyde can be employed when used in admixture with an aldehyde that does contain an enolizable hydrogen. In many cases, it will be desired to employ as the aldehyde reactant the same aldehyde that was used to produce the 4-m-dioxanol, although different aldehydes or a mixture of aldehydes can be employed if desired. It is also within the scope of the invention to employ a 4-m-dioxanol that was produced from a mixture of aldehydes. When an aldehyde is employed in conjunction with the 4-m-dioxanol, the

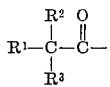

moiety of said aldehyde will appear in the acid moiety of the 1,3-glycol half ester product. The proportions of 4-m-dioxanol and aldehyde can vary widely. For instance, there can be employed up to 10 moles or more of aldehyde per mole of 4-m-dioxanol. Preferably, there is employed from about 2 to about 5 moles of aldehyde per mole of 4-m-dioxanol.

The product of the invention can be recovered by standard procedures, such as by distillation to remove unreacted starting materials. The product can then be recovered as a residue, or it can be fractionally distilled under a vacuum.

*Example 1.—2,2,4-trimethyl-1,3-pentanediol monoisobutyrate*

To a 1-liter, stainless-steel autoclave of the rocker type was charged a mixture of 250 grams of freshly distilled isobutyraldehyde and 250 (1.16 moles) grams of 2,6-diisopropyl-5,5-dimethyl-4-hydroxy-1,3-dioxane, prepared by treating isobutyraldehyde with dilute caustic soda as described in British Patent 819,198. Rocking was commenced and the temperature was raised rapidly to 127±2° under autogenous pressure. Heating at this temperature was continued for five hours, during which time a maximum pressure of 71 p.s.i.g. was developed in the autoclave. The autoclave contents (498 g.) was then charged to a distillation apparatus and was stripped free of isobutyraldehyde by beginning at atmospheric pressure and finishing at 10 mm. pressure and at a kettle temperature of 115° C. Continuation of the distillation at 10–11 mm. pressure afforded the crude product (129 g., 51.6% of theory) as a mobile liquid boiling from 125–146° C. Redistillation of this material at 125 mm. pressure served to remove a small (3 g.) heads fraction and to afford a water-white product having a boiling point of 183–184°/125 mm. a refractive index of 1.4422 at 20° C. and a purity of 99.8 percent by saponification analysis. The infrared spectrum was consistent with the assigned structure showing bands at 2.85µ (hindered OH). 3.38 and 3.5µ (CH$_2$, CH$_3$ and CH), 5.85µ (ester C=O), 7.2 and 7.3 (C—CH$_3$)$_2$, 7.93, 8.35 and 8.65 (ester C—O) and 10.0µ (C—OH). The microanalysis was as follows:

*Analysis.*—Calcd. for C$_{12}$H$_{24}$O$_3$, C, 66.66; H, 11.12. Found: C, 6.45; H, 11.33.

*Example 2.—2,2,4-trimethyl-1,3-pentanediol monoisobutyrate*

In equipment identical to that described in Example 1, two runs were made in which the 2,6-diisopropyl-5,5-dimethyl-4-hydroxy-1,3-dioxane was heated in the absence of added isobutyraldehyde. In the first case, the 4-m-dioxanol (1.81 m.) was held at a temperature of 120° C. for a period of 5¾ hours, a maximum pressure of 55 p.s.i.g. being developed. In the second case, the 4-m-dioxanol (1.81 m.) was heated for 6¼ hours at a temperature of 140° C., a maximum of 110 p.s.i.g. pressure being developed in the autoclave. Work-up of the crude products from these runs in the manner discussed in Example 1 afforded a 21.8 percent yield of 2,2,4-trimethyl-1,3-pentanediol monoisobutyrate from the 120° reaction and a 15.4 percent yield from the 140° reaction. It is apparent from this data that the presence of an excess of the simple aldehyde greatly increases the yield of half-ester in this process.

*Example 3.—2-ethyl-1,3-hexanediol mono-n-butyrate*

To the apparatus described in Example 1 was charged a mixture of 200 g. (0.93 mole) of 2,6-dipropyl-5-ethyl-4-hydroxy-1,3-dioxane and 92 g. (1.28 moles) of n-butyraldehyde. This mixture was heated with rocking for 5¼ hours in the temperature range of 128–135° C., with a maximum pressure of 50 p.s.i.g. being developed in the autoclave. The crude reaction product contained a small amount of a water phase, indicating that some dehydration had occurred as a competing reaction. Purification of the crude reaction product by distillation afforded, following removal of by-product 2-ethyl-2-hexenal, 39 grams (19.5 percent) of product ester boiling from 145–155° C. at 10 mm. pressure. Redistillation of this material served to remove a small fore fraction and to obtain analytically pure ester with a boiling point of 146°/10 mm., a refractive index of 1.4433 at 20° C. and an indicated purity of 97.7 percent by saponification analysis. The infrared spectrum was consistent with the assigned structure, displaying bonds at 2.9µ (OH), 3.4 and 3.5 (CH$_2$), 5.82µ (ester C=O), 6.8µ (CH$_2$, CH$_3$), 7.22µ (C—CH$_2$), 8.4µ (C—O), 9.12 and 9.52µ (alcohol C—O). The microanalysis was as follows:

*Analysis.*—Calcd. for C$_{12}$H$_{24}$O$_3$: C, 66.66; H, 11.12. Found: C, 66.89; H, 10.87.

*Example 4.—2-ethyl-1,3-hexanediol mono-n-butyrate*

In equipment identical to that described in previous examples, 383 g. (1.76 m.) of 2,6-dipropyl-5-ethyl-4-hydroxy-1,3-dioxane was heated for a period of 6½ hours at temperatures of 116–120° C. Work-up in the manner discussed above afforded, in addition to water, recovered n-butyraldehyde and by-product 2-ethyl-2-hexenal, 40 g. (10.5 percent) of product ester boiling from 150–160° C. at 8.5–9.5 mm. pressure. As in the case of Example 2, these results clearly show that an excess of the simple aldehyde leads to better yields in these reactions.

We claim:
1. Process which comprises heating a 4-m-dioxanol in a closed reaction zone to an elevated temperature above the decomposition temperature of said 4-m-dioxanol, said temperature being within the range of from about 75° to 250° C., for a period of from about 1 to about 20 hours, to produce a half-ester of a 1,3-glycol, wherein said 4-m-dioxanol is a compound of the formula:

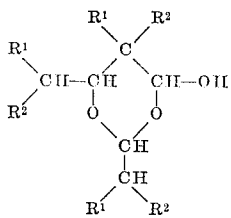

wherein each $R^1$ and $R^2$ individually represents a member of the group consisting of hydrogen and alkyl, alkenyl, alkynyl, cycloalkyl, cycloalkenyl, phenyl, aralkyl, and alkaryl groups of up to 10 carbon atoms, and $R^1$ and $R^2$ taken together with the carbon atom to which they are bonded to form cycloalkyl or cycloalkenyl groups of up to 10 carbon atoms.

2. Process of claim 1 wherein said 4-m-dioxanol is heated in a closed reaction zone in admixture with an aldehyde of the formula:

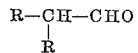

wherein each R individually represents hydrogen, phenyl, or cycloalkyl, alkyl, alkenyl, aralkyl, or alkaryl of up to 10 carbon atoms, or the two R variables taken together with the carbon atom to which they are bonded to form cycloalkyl or cycloalkenyl of up to 10 carbon atoms.

3. Process of claim 1 wherein said 4-m-dioxanol is a 2,6-dialkyl-5-alkyl-4-hydroxy-1,3-dioxane.

4. Process of claim 2 wherein said 4-m-dioxanol is 2,6-diisopropyl-5,5-dimethyl-4-hydroxy - 1,3 - dioxane, wherein said aldehyde is isobutyraldehyde, and wherein the 1,3-glycol half-ester product is 2,2,4-trimethyl-1,3-pentanediol monoisobutyrate.

References Cited

Arundale et al.: Chem. Reviews, vol. 51, No. 3, December 1952, pp. 519–528.

Chemical Abstracts, 1961, 55:27056C.

LORRAINE A. WEINBERGER, *Primary Examiner.*

V. G. GARNER, *Assistant Examiner.*